United States Patent [19]
Eberspach et al.

[11] Patent Number: 5,116,891
[45] Date of Patent: May 26, 1992

[54] FLAME-RESISTANT POLYMERIC COMPOSITIONS

[75] Inventors: Werner Eberspach, Frankfurt am Main, Fed. Rep. of Germany; Daniel Scharf, East Greenwich, R.I.; Manfred Lysek, Bonn, Fed. Rep. of Germany

[73] Assignee: Hoechst Aktiengesellschaft, Frankfurt am Main, Fed. Rep. of Germany

[21] Appl. No.: 643,470

[22] Filed: Jan. 18, 1991

[30] Foreign Application Priority Data

Feb. 3, 1990 [DE] Fed. Rep. of Germany ....... 4003231

[51] Int. Cl.⁵ .................. C08K 5/357; C08K 5/3492
[52] U.S. Cl. ..................... 524/97; 524/100; 524/206; 524/387; 524/414; 524/416
[58] Field of Search ............. 524/97, 414, 416, 100, 524/206, 387; 252/606, 609; 544/113, 83, 209, 212

[56] References Cited

U.S. PATENT DOCUMENTS

| | | | |
|---|---|---|---|
| 3,634,110 | 1/1972 | Varsanyl et al. | 524/97 |
| 3,810,862 | 5/1974 | Matbis et al. | 524/100 |
| 4,198,493 | 4/1980 | Marciandi | 524/101 |
| 4,312,805 | 1/1982 | Bertelli et al. | 524/414 |
| 4,480,092 | 10/1984 | Lai et al. | 524/100 |
| 4,504,610 | 3/1985 | Fontanelli et al. | 524/96 |
| 4,542,170 | 9/1985 | Hall et al. | 524/100 |
| 4,966,931 | 10/1990 | Akitaya et al. | 524/97 |

FOREIGN PATENT DOCUMENTS 0115871 11/1987 European Pat. Off.

*Primary Examiner*—Veronica P. Hoke

[57] ABSTRACT

Flame-resistant polymeric compositions, preferably olefinic polymers and/or copolymers, containing 8 to 45% by weight of a flameproofing system. This flameproofing system comprises at least one phosphorus component and a monomeric triazinylpiperazine. The phosphours component is a free-flowing, pulverulent, sparingly water-soluble ammonium polyphosphate, while the triazinylpiperazine used is a pulverulent bis-triazinylpiperazine.

16 Claims, No Drawings

FLAME-RESISTANT POLYMERIC COMPOSITIONS

The present invention relates to flame-resistant polymeric compositions, preferably olefinic polymers and/or copolymers.

U.S. Pat. No. 3,810,862 discloses to flameproof polyolefins using mixtures of ammonium polyphosphate, melamine and dipentaerythritol or melamine pyrophosphate and dipentaerythritol.

According to U.S. Pat. No. 4,312,805, self-extinguishing compositions based on polypropylene contain ammonium polyphosphate, melamine and nylon 6.

The self-extinguishing polyolefins of U.S. Pat. No. 4,198,493 contain, as flameproofing agents, ammonium polyphosphate, cyanuric acid and tris(2-hydroxyethyl) isocyanurate.

Finally, European Patent 115 871 discloses self-extinguishing olefinic polymers and copolymers which contain ammonium phosphate or amine phosphate and a nitrogen-containing, water-insoluble compound, which may comprise poly(triazinylpiperazine).

Although the relatively low molecular weight of monomeric triazinylpiperazines would give rise to expectations of a gradual migration out of the polymer matrix and thus a gradual impairment in their flameproofing action, it has now been found that, surprisingly, even mixtures of ammonium polyphosphate and monomeric triazinyl piperazines, in particular in olefinic polymers or copolymers, cause an excellent flameproofing effect which, in addition, proves to be long-term stable.

In detail, the invention relates to flame-resistant polymeric compositions which contain 8 to 45% by weight of a flameproofing system which comprises at least one phosphorus component and a monomeric triazinylpiperazine, the phosphorus component being a free-flowing, pulverulent, sparingly water-soluble ammonium polyphosphate, and a pulverulent bistriazinylpiperazine being used.

In addition, the flame-resistant polymeric compositions according to the invention may optionally have the further features that a) the flameproofing system additionally contains a pulverulent cosynergist, selected from the group comprising tris(2-hydroxyethyl) isocyanurate, pentaerythritol, dipentaerythritol, melamine cyanurate, melamine, melamine pentylate, piperazine pyrophosphate, dicyandiamide or cellulose;

b) up to 7% by weight of a cosynergist, based on the flame-resistant polymeric compositions, are present;

c) the flameproofing system additionally contains up to 3% by weight, based on the flame-resistant polymeric compositions, of a polymer selected from the group comprising polyester, polyamide, polyacrylonitrile, polybenzimidazole, polyphenylene sulfide and polytetrafluoroethylene, in the form of a micropowder having a particle size of less than 10 μm;

d) the flameproofinq system additionally contains up to 3% by weight, based on the flame-resistant polymeric compositions, of at least one oxide, hydroxide or carbonate of a metal or metalloid in the form of powders;

e) the pulverulent oxides, hydroxides or carbonates of a metal or metalloid have particle sizes of from 0.01 to 10 μm;

f) the flameproofing system additionally contains up to 2% by weight, based on the flame-resistant polymeric compositions, of at least one stabilising agent, selected from the group comprising polynuclear phenols, dialkyl sulfides and aromatic phosphites;

g) the flameproofing system additionally contains up to 1% by weight, based on the flame-resistant polymeric compositions, of calcium stearate;

h) the ammonium polyphosphate of the formula $(NH_4PO_3)_n$ has a chain length n of from 200 to 1000, preferably 700, a phosphorus content of $31.5 \pm 0.5\%$ by weight, a nitrogen content of $14.5 \pm 0.5\%$ by weight, and has a water-soluble content of less than 10% —measured in 10% strength aqueous suspension at 25° C. (®Exolit 422);

i) the ammonium polyphosphate of the formula $(NH_4PO_3)_n$ has a chain length n of from 200 to 1000, preferably 700, is microencapsulated with melamine-formaldehyde resin and has a phosphorus content of $29.0 \pm 1\%$, a nitrogen content of $16.5 \pm 1\%$ and has a water-soluble content of less than 0.3%—measured in 10% strength aqueous suspension at 25° C. (®Exolit 462);

j) the flameproofing system contains 5 to 30% by weight of ammonium polyphosphate, based on the flame-resistant polymeric compositions;

k) a bistriazinylpiperazine of the formula

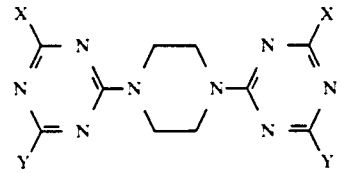

in which X and Y are identical or different $-OR^1$, $-SR^1$ or $-NR^2R^3$ radicals where $R^1$ is a $C_1$- to $C_{18}$-alkyl group, a $C_5$- to $C_{18}$-cycloalkyl group, a phenyl or naphthyl group which is optionally substituted by inert radicals, or a $C_7$- to $C_{18}$-aralkyl group;

$R^2$ and $R^3$, independently of one another, are a $C_1$- to $C_3$-alkyl group, a $C_5$- to $C_{18}$l-cycloalkyl group, a phenyl or naphthyl group which is optionally substituted by inert radicals, or a $C_7$- to $C_{18}$-aralkyl group, or $NR^2R^3$ is piperidinyl of the formula

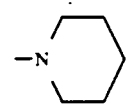

or morpholinyl of the formula

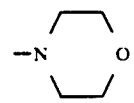

is used;

l) N,N'-bis(2,4-dimethoxy-1,3,5-triazin-6-yl)piperazine is used;
m) N,N'-bis(2,4-diethoxy-1,3,5-triazin-6-yl)piperazine is used;
n) N,N'-bis(2,4-dimorpholinyl-1,3,5-triazin-6-yl)-piperazine is used;
o) 3 to 15% by weight of bistriazinylpiperazine, based on the flame-resistant polymeric compositions, are present.

The bistriazinylpiperazines are advantageously employed in particle size of less than 80 μm.

The polymers provided according to the invention with the flameproofing system may be: polyethylene, polypropylene, poly-1-butene, polymethyl-1-pentene, ethylene-propylene copolymers, terpolymers of ethylene and propylene with a diene; polystyrene, polymethylstyrene; mixtures of polypropylene and polyethylene, polypropylene and poly-1-butene, butadiene-acrylonitrile copolymer with styrene-butadiene copolymer; polyvinyl chloride, polyacrylate, polymethacrylate, polyethyl acrylate and copolymers thereof with one another and with other vinyl compounds (acrylonitrile-butadiene-styrene, acrylonitrile-styrene and acrylonitrile-styrene-acrylate copolymers); cellulose acetate, cellulose nitrate; phenol-, urea- or melamine-formaldehyde resin, polyamide, polyester, polyformaldehyde and polycarbonate.

The aim in the preparation of the flame-resistant polymeric compositions according to the invention is the most homogeneous distribution possible of the flameproofing system in the polymer. In the case of thermoplastics, the components are to this end intensively mixed in finely divided form, and the mixture is extruded and granulated.

Examples A, B and C describe the preparation of bistriazinylpiperazines which can be used according to the invention, while Examples 1 to 27 shown in Tables 1 to 5 cover flame-resistant polymeric compositions according to the invention.

EXAMPLE A

Preparation of
N,N'-bis(2,4-dimethoxy-1,3,5-triazin-6-yl)piperazine 550 ml of methanol, 55 ml of water, 0.25 g of tetra-n-butylammonium bisulfate and 1 mol of NaHCO$_3$ were mixed, and 0.5 mol of cyanuric chloride was added in portions while maintaining a maximum reaction temperature of 30° C, a pH of from 5. to 8 being established. The mixture was stirred at room temperature for 40 minutes and then refluxed for 30 minutes. Aqueous solutions of piperazine (13% strength by weight; 0.275 mol) and sodium carbonate (20% strength by weight; 0.275 mol) were subsequently added dropwise. The reaction mixture was stirred at room temperature for one hour and refluxed for two hours. After cooling, the mixture was neutralized with dilute sulfuric acid. The mixture was filtered, and the residue was washed with water and dried, giving a white microcrystalline powder.

Yield: 87.2% of theory.
Melting point: 229° to 232° C. (with decomposition).
Elemental analysis: Found: C 45.78%; H 5.70%; N 31.18%. Calculated: C 46.15 %; H 5.53%; N 30.75% (for $C_{14}H_{20}N_8O_4$).

EXAMPLE B

Preparation of
N,N'-bis(2,4-diethoxy-1,3,5-triazin-6-yl)piperazine 1 mol of NaHCO$_3$ and 0.5 g of tetra-n-butylammonium bisulfate were suspended in a mixture of 400 ml of ethanol and 40 ml of water, and 0.5 mol of cyanuric chloride was added in portions sufficiently slowly that the reaction temperature did not exceed 30° C and the pH was between 5 and 8. The mixture was stirred at room temperature for 60 minutes and refluxed for 30 minutes. 0.275 mol of each of piperazine and sodium carbonate were then simultaneously added dropwise at room temperature as aqueous solutions (12 and 20% by weight respectively). The reaction mixture was stirred at room temperature for one hour and subsequently refluxed for three hours. After cooling, the mixture was filtered, and the residue was washed with water and dried to constant weight, giving a white microcrystalline powder.

Yield: 81% of theory.
Melting point: 189° to 193° C. (with decomposition).
Elemental analysis: Found: C 50.98%; H 6.30%; N 27.12%. Calculated: C 51.42%; H 6.71%; N 26.65% (for $C_{18}H_{28}N_8O_4$).

EXAMPLE C

Preparation of
N,N'-bis(2,4-dimorpholinyl-1,3,5-triazin-6-yl)piperazine

The preparation described below was carried out under nitrogen.

0.5 mol of cyanuric chloride was suspended in a mixture of 2 l of water and 1 kg of ice, and 1 mol of morpholine and 0.5 mol of NaOH (as a 10% strength by weight aqueous solution) were simultaneously added dropwise. The addition was carried out sufficiently slowly that a pH of between 5 and 10 was maintained. The mixture was stirred at 25° C. for 30 minutes, and a further 0.5 mol of NaOH (as a 10% strength by weight aqueous solution) was added dropwise. The reaction mixture was heated at 80° C. for 90 minutes and cooled to room temperature, and 0.28 mol of piperazine and 0.56 mol of NaOH (as a 10% strength by weight aqueous solution) were added dropwise. The mixture was finally refluxed for 12 hours, cooled and filtered, and the residue was washed with water and dried, giving a white microcrystalline powder.

Yield: 98.4% of theory.
Melting point: 317° to 321° C. (with decomposition).
Elemental analysis: Found: C 52.94%; H 7.23%; N 28.93%. Calculated: C 53.41%; H 6.89%; N 28.75% (for $C_{26}H_{40}N_{12}O_4$).

The flame-resistant polymeric compositions were prepared by mixing the components in a SPANGENBERG intensive mixer, extruding the mixture in a WEBER small extruder (20 mm screw diameter) at 180° to 200° C. and granulating the extrudate using a DREHER laboratory granulator. The 500 g of granules in each case prepared in this way were subsequently molded in a steam-heated BECKER-VAN-HüLLEN press at 195° C. and a pressure of 300 bar to give test sheets with a thickness of 1.6 mm.

Test specimens 127 mm in length and 12.7 mm in width were cut out of the test sheets. The fire behavior of the test specimens was determined in accordance with the procedure of the UNDERWRITERS LABORATORIES: "Test for Flammability of Plastic Materia- I—UL 94"(Edition of 2 May 1975), and its oxygen index was determined in accordance with ASTM-D 2863.

The results of the fire tests are given in the bottom two lines of Tables 1 to 4.

The superscripts in Tables 1 to 4 have the following meanings:

1) Polypropylene powder from HOECHST AG, Frankfurt
   Melt flow index (MFI 230/5) of 55 g/10 min
2a) Ammonium polyphosphate grades from HOECHST AG,
2b) Frankfurt
3) Mixture of 0.16% of ®Hostanox 0.3 (stabiliser based on polynuclear phenols; Hoechst AG, Frankfurt)
   0.16% of ®Hostanox SE 10 (stabiliser based on dialkyl sulfides; Hoechst AG, Frankfurt)
   0.16% of ®Hostanox PAR 24 (stabiliser based on aromatic phosphites; Hoechst AG, Frankfurt)
   0.16% of calcium stearate
4) Polyethylene powder from HOECHST AG, Frankfurt
   Melt flow index (MFI 190/5) of less than 0.1 g/10 min In order to determine the ageing resistance of the polymeric compositions provided with a flame-resistant finish according to the invention, the product from Example 18 was stored in a circulation drying oven at 150° C. for various periods. After each storage period, the product was classified in accordance with UL-94 and the oxygen index of the test specimen was determined. The result of the ageing test is given in Table 5.

TABLE 1

| | \multicolumn{9}{c|}{Examples (constituents in %)} | | | | | | | | |
|---|---|---|---|---|---|---|---|---|---|
| | 1 | 2 | 3 | 4 | 5 | 6 | 7 | 8 | 9 |
| ®Hostalen PPU 0180[1] | 69.36 | 69.36 | 69.36 | 69.36 | 69.36 | 69.36 | 67.29 | 67.29 | 67.29 |
| ®Exolit 422[2a] | 19.33 | 18.67 | 18.67 | 18.67 | 19.33 | 18.00 | — | — | — |
| ®Exolit 462[2b] | — | — | — | — | — | — | 20.74 | 20.74 | 20.05 |
| Compound as in Example B | 9.67 | 9.33 | 9.33 | 9.33 | 9.67 | 9.00 | 9.33 | 9.33 | 9.02 |
| $TiO_2$ | 1.00 | 1.00 | — | 2.00 | — | 1.00 | 1.00 | — | 1.00 |
| $SiO_2$ | — | — | 1.00 | — | — | 1.00 | — | 1.00 | 1.00 |
| Polytetrafluoroethylene | — | 1.00 | 1.00 | — | 1.00 | 1.00 | 1.00 | 1.00 | 1.00 |
| Standard additives[3] | 0.64 | 0.64 | 0.64 | 0.64 | 0.64 | 0.64 | 0.64 | 0.64 | 0.64 |
| UL-94 vertical test (1.6 mm) | V-II | V-0 | V-II | V-II | V-II | V-0 | V-0 | V-II | V-0 |
| Oxygen index | 29.0 | 30.5 | 30.0 | 31.0 | 29.0 | 31.0 | 29.5 | 29.5 | 30.5 |

TABLE 2

| | \multicolumn{9}{c|}{Examples (constituents in %)} | | | | | | | | |
|---|---|---|---|---|---|---|---|---|---|
| | 10 | 11 | 12 | 13 | 14 | 15 | 16 | 17 | 18 |
| ®Hostalen PPU 0180[1] | 70.00 | 69.36 | 72.36 | 72.36 | 72.36 | 72.36 | 72.36 | 72.36 | 76.36 |
| ®Exolit 422[2] | 20.00 | 20.00 | 18.00 | 17.33 | 17.33 | 17.33 | 16.67 | 16.67 | 14.00 |
| Compound as in Example C | 10.00 | 10.00 | 9.00 | 8.67 | 8.67 | 8.67 | 8.33 | 8.33 | 7.00 |
| $TiO_2$ | — | — | — | 1.00 | — | — | — | 2.00 | — |
| $SiO_2$ | — | — | — | — | 1.00 | — | 1.00 | — | 1.00 |
| $Mg(OH)_2$ | — | — | — | — | — | — | 1.00 | — | — |
| Polytetrafluoroethylene | — | — | — | — | — | 1.00 | — | — | 1.00 |
| Standard additives[3] | — | 0.64 | 0.64 | 0.64 | 0.64 | 0.64 | 0.64 | 0.64 | 0.64 |
| UL-94 vertical test (1.6 mm) | V-0 | V-0 | V-II | V-0 | V-II | V-0 | V-0 | V-0 | V-0 |
| Oxygen index | 29.5 | 30.5 | 29.0 | 33.5 | 33.0 | 33.0 | 32.5 | 33.0 | 32.0 |

TABLE 3

| | \multicolumn{4}{c|}{Examples (constituents in %)} | | | |
|---|---|---|---|---|
| | 19 | 20 | 21 | 22 |
| ®Hostalen PPU 0180[1] | 70.42 | 70.42 | 70.42 | 74.45 |
| ®Exolit 462[2b] | 19.27 | 18.58 | 18.58 | 15.82 |
| Compound as in Example C | 8.67 | 8.36 | 8.36 | 7.12 |
| $TiO_2$ | 1.00 | 1.00 | 1.00 | — |
| $SiO_2$ | — | — | 1.00 | 1.00 |
| Polytetrafluoroethylene | — | 1.00 | — | 1.00 |
| Standard additives[3] | 0.64 | 0.64 | 0.64 | 0.64 |
| UL-94 vertical test (1.6 mm) | V-0 | V-0 | V-II | V-0 |
| Oxygen index | 32.0 | 31.5 | 31.5 | 30.0 |

TABLE 4

| | \multicolumn{5}{c|}{Examples (constituents in %)} | | | | |
|---|---|---|---|---|---|
| | 23 | 24 | 25 | 26 | 27 |
| ®Hostalen GR 7255 P[4] | — | — | — | — | 69.00 |
| ®Hostalen PPU 180[1] | 72.36 | 72.36 | 72.36 | 72.36 | — |
| ®Exolit 422[2b] | 16.00 | 18.91 | 16.00 | 17.33 | 20.00 |
| Compound as in Example C | 6.00 | 4.73 | 6.00 | 6.50 | 10.00 |
| Tris(2-hydroxyethyl) isocyanurate | 4.00 | — | — | — | — |
| Melamine | — | 2.36 | — | — | — |
| Dipentaerythritol | — | — | 4.00 | — | — |
| Melamine cyanurate | — | — | — | 2.17 | — |
| $TiO_2$ | 1.00 | 1.00 | 1.00 | 1.00 | 1.00 |
| Standard additives[3] | 0.64 | 0.64 | 0.64 | 0.64 | — |
| UL-94 vertical test (1.6 mm) | V-0 | V-0 | V-0 | V-0 | V-0 |
| Oxygen index | 34.0 | 33.0 | 31.0 | 34.0 | 33.5 |

TABLE 5

| | | \multicolumn{4}{c|}{Example 18} | | | |
|---|---|---|---|---|---|
| | without ageing | after 20 days[4] | after 40 days[4] | after 60 days[4] | after 80 days[4] |
| UL-94 vertical test (1.6 mm) | V-0 | V-0 | V-0 | V-0 | n.c.[5] |

TABLE 5-continued

| | Example 18 | | | | |
|---|---|---|---|---|---|
| | without ageing | after 20 days[4] | after 40 days[4] | after 60 days[4] | after 80 days[4] |
| Oxygen index | 32.0 | 32.0 | 30.5 | 29.5 | 27.0 |

[4] Storage at 150° C in a circulation drying oven
[5] Not classified

We claim:

1. A flame-resistant polymeric composition which contains 8 to 45% by weight of a flameproofing system which comprises at least one free-flowing, pulverulent, sparingly water-soluble ammonium polyphosphate and a monomeric, pulverulent bistriazinylpiperazine of the formula

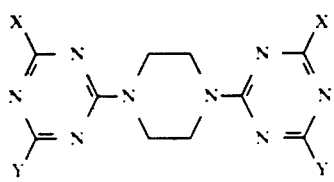

in which X and Y are identical or different $-OR^1$, $-SR^1$ or $-NR^2R^3$ radicals where $R^1$ is a $C_1$- to $C_{18}$-alkyl group, a $C_5$- to $C_{18}$-cycloalkyl group, a phenyl or naphthyl group which is optionally substituted by inert radicals, or a $C_7$- to $C_{18}$-aralkyl group;

$R^2$ and $R^3$, independently of one another, are a $C_1$- to $C_3$-alkyl group, a $C_5$- to $C_{18}$-cycloalkyl group, a phenyl or naphthyl group which is optionally substituted by inert radicals, or a $C_7$- to $C_{18}$-aralkyl group, or $NR^2R^3$ is piperidinyl of the formula

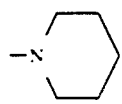

or morpholinyl of the formula

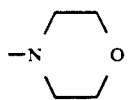

wherein 5 to 30% by weight of ammonium polyphosphate and 3 to 15% by weight of bistriazinyl piperazine, both based on the flame-resistant polymeric composition, are present.

2. A flame-resistant polymeric composition as claimed in claim 1, comprising olefinic polymers.

3. A flame-resistant polymeric composition according to claim 1, which comprises olefinic copolymers.

4. A flame-resistant polymeric composition as claimed in claim 1, wherein the flameproofing system additionally contains a pulverulent cosynergist, selected from the group comprising tris(2-hydroxyethyl) isocyanurate, pentaerythritol, dipentaerythritol, melamine cyanurate, melamine, melamine pentylate, piperazine pyrophosphate, dicyandiamide or cellulose.

5. A flame-resistant polymeric composition as claimed in claim 4, wherein up to 7% by weight of a cosynergist, based on the flame-resistant polymeric compositions, are present.

6. A flame-resistant polymeric composition as claimed in claim 1, wherein the flameproofing system additionally contains up to 3% by weight, based on the flame-resistant polymeric compositions, of a polymer selected from the group comprising polyester, polyamide, polyacrylonitrile, polybenzimidazole, polyphenylene sulfide and polytetrafluoroethylene, in the form of a micropowder having a particle size of less than 10 μm.

7. A flame-resistant polymeric composition as claimed in claim 1, wherein the flameproofing system additionally contains up to 3% by weight, based on the flame-resistant polymeric compositions, of at least one oxide, hydroxide or carbonate of a metal or metalloid in the form of powders.

8. A flame-resistant polymeric composition as claimed in claim 7, wherein the pulverulent oxides, hydroxides or carbonates of a metal or metalloid have particle sizes of from 0.01 to 10 μm.

9. A flame-resistant polymeric composition as claimed in claim 1, wherein the flameproofing system additionally contains up to 2% by weight, based on the flame-resistant polymeric compositions, of at least one stabilising agent, selected from the group comprising polynuclear phenols, dialkyl sulfides and aromatic phosphites.

10. A flame-resistant polymeric composition as claimed in claim 1, wherein the flameproofing system additionally contains up to 1% by weight, based on the flame-resistant polymeric compositions, of calcium stearate.

11. A flame-resistant polymeric composition as claimed in claim 1, wherein the ammonium polyphosphate of the formula $(NH_4PO_3)_n$ has a chain length n of from 200 to 1000, a phosphorus content of 31.5±0.5% by weight, a nitrogen content of 14.5±0.5% by weight, and has a water-soluble content of less than 10%—measured in 10% strength aqueous suspension at 25° C.

12. A flame-resistant polymeric composition as claimed in claim 11, wherein the flameproofing system contains 5 to 30% by weight of ammonium polyphosphate, based on the flame-resistant polymeric compositions.

13. A flame-resistant polymeric composition as claimed in claim 1, wherein the ammonium polyphosphate of the formula $(NH_4PO_3)_n$ has a chain length n of from 200 to 1000, is microencapsulated with melamine-formaldehyde resin and has a phosphorus content of 29.0±1%, a nitrogen content of 16.5±1% and has a water-soluble content of less than 9.3%—measured in 10% strength aqueous suspension at 25° C.

14. A flame-resistant polymeric composition as claimed in claim 1, wherein N,N'-bis(2,4-dimethoxy-1,3,5-triazin-6-yl)piperazine is used.

15. A flame-resistant polymeric composition as claimed in claim 15, wherein N,N'-bis(2,4-diethoxy-1,3,5-triazin-6-yl)piperazine is used.

16. A flame-resistant polymeric composition as claimed in claim 1, wherein N,N'-bis(2,4-dimorpholinyl-1,3,5-triazin-6-yl)piperazine is used.

* * * * *